(12) United States Patent
Harris et al.

(10) Patent No.: US 9,375,865 B2
(45) Date of Patent: Jun. 28, 2016

(54) AUTOCLAVE HEALTH MONITORING AND CONTROL SYSTEM

(71) Applicant: Spirit AeroSystems, Inc., Wichita, KS (US)

(72) Inventors: Ryan Craig Harris, Derby, KS (US); Gerard Spexarth, Wichita, KS (US); Rodney Eugene Bahr, Wichita, KS (US)

(73) Assignee: Spirit AeroSystems, Inc., Wichita, KS (US)

(*) Notice: Subject to any disclaimer, the term of this patent is extended or adjusted under 35 U.S.C. 154(b) by 768 days.

(21) Appl. No.: 13/679,569

(22) Filed: Nov. 16, 2012

(65) Prior Publication Data

US 2013/0161850 A1 Jun. 27, 2013

Related U.S. Application Data

(60) Provisional application No. 61/580,568, filed on Dec. 27, 2011.

(51) Int. Cl.
*B29C 45/76* (2006.01)
*B29C 37/00* (2006.01)
*B29C 70/44* (2006.01)
*B29C 35/02* (2006.01)

(52) U.S. Cl.
CPC ......... *B29C 37/0096* (2013.01); *B29C 35/0227* (2013.01); *B29C 70/44* (2013.01)

(58) Field of Classification Search
CPC ............ B29C 37/0089; B29C 37/0096; B29C 36/0227; B29C 70/44; B29C 70/443
USPC ........... 264/40.1, 40.3, 40.5, 40.7, 45.1, 45.2, 264/50, 51, 523, 529, 314, 87, 510, 511, 264/526, 551, 553, 566, 102
See application file for complete search history.

(56) References Cited

U.S. PATENT DOCUMENTS 4,221,124 A * 9/1980 Jones ..................... G01M 3/26
425/33
5,366,684 A * 11/1994 Corneau, Jr. ........ B29C 43/3642
156/285

* cited by examiner

*Primary Examiner* — Stella Yi
(74) *Attorney, Agent, or Firm* — Hovey Williams LLP

(57) ABSTRACT

A bladder monitoring apparatus and method for monitoring an inflatable bladder during curing of composite material in an autoclave. The bladder may be wrapped with composite material and have an impermeable membrane sealed around the composite material. The method may include the steps of fluidly coupling a vacuum port of the impermeable membrane with a vacuum source and fluidly coupling a vent of the bladder with a first port of a flow meter located outward of the autoclave. A second port of the flow meter may also be fluidly coupled with atmosphere within the autoclave. The method may then include evacuating air from within the impermeable membrane. If a flow above a threshold flow is detected by the flow meter, the leak in the bladder may be located and repaired or a valve of the flow meter between the first and second ports may be closed.

16 Claims, 4 Drawing Sheets

AUTOCLAVE HEALTH MONITORING AND CONTROL SYSTEM

RELATED APPLICATIONS

This application claims priority benefit of a provisional application entitled, "Autoclave Health Monitoring and Control System," Ser. No. 61/580,568, filed Dec. 27, 2011 and incorporated by reference herein in its entirety.

BACKGROUND

To manufacture aircraft components, such as stringers, composite material is often applied to forming bladders and then wrapped with an impermeable membrane, such as a vacuum bag, before being cured. During cure, vacuum is applied via a vacuum port in the vacuum bag, causing the vacuum bag to deflate against the composite material and causing the bladder to inflate, pressing the composite material between the vacuum bag and the bladder.

Forming bladders are susceptible to developing leaks, especially when exposed to high temperatures and pressures in autoclaves during cure. Some leaks are detected after a cure cycle that were not apparent prior to the cure. The added pressure and heat during cure may cause undetected leaks in the bladder to develop into larger, detrimental leaks during the autoclave cure cycle. It is also possible that human error may create leaks in bladders at a stage in which the bladders cannot be removed from the composite material or repaired. Methods have been developed for detecting vacuum bag leaks, though the methods are not effective at locating precise locations of these leaks. These prior art methods also fail to detect bladder leaks during cure cycle. Furthermore, prevention of resulting damage from such leaks is difficult to manage.

One prior art method of detecting leaks in a vacuum bag includes placing a vacuum gage in line with a vacuum source, between the vacuum bag and the vacuum source, to sense vacuum decay. If a leak occurs in the vacuum bag or in the bladder prior to reaching a critical stage cure temperature, the cure cycle may be aborted and the leak in the vacuum bag may be fixed. For example, the operator may open a door of the autoclave and search for the leak using an ultrasonic microphone. Once the leak is located, the operator may fix the leak by various patching and repair methods known in the art. However, it is unknown what effect a leaking bladder has on overall vacuum bag integrity. Some of the vacuum decay detected by the vacuum gage could be attributed to a leaking bladder. In this case, the operator might detect vacuum decay and suspect that there is a vacuum bag leak. The operator would then abort the cure and search for a vacuum bag leak without finding one. If the leak is really merely a pin hole in the side of the bladder, the operator can't access or fix this bladder leak, since he doesn't know whether the vacuum bag or the bladder is leaking.

SUMMARY

Embodiments of the present invention solve the above-mentioned problems and provide a distinct advance in the art of detecting leaks during the forming of composite parts. An embodiment of the invention is an autoclave health monitoring system for detecting leaks in a bladder wrapped with composite material during autoclave cure. The autoclave health monitoring system may include a flow meter, a first conduit, and a second conduit. During autoclave cure, an impermeable membrane may be sealed around the composite material and compressed against the uncured composite material by vacuum evacuation of the air between the impermeable membrane and the bladder being heated in an autoclave. The bladder may have a vent or vent opening extending outward of the impermeable membrane. The flow meter may have a first port and a second port, may be positioned outward of the autoclave, and may detect an amount of air flow between the first and second ports. The first conduit may fluidly couple the vent of the bladder with the first port of the flow meter. The second conduit may fluidly couple the second port of the flow meter with atmosphere within the autoclave and outward of the impermeable membrane.

A method for monitoring the bladder during autoclave cure may include the steps of placing uncured composite material around at least a portion of the bladder and placing the impermeable membrane around the uncured composite material, thereby sealing the uncured composite material between the bladder and the impermeable membrane. The method may further include the steps of placing the bladder, uncured composite material, and impermeable membrane into the autoclave, fluidly coupling a vacuum port formed in the impermeable membrane with a vacuum source, and fluidly coupling the vent of the bladder with the first port of the flow meter. The second port of the flow meter may be fluidly coupled with atmosphere within the autoclave. The method may further include the steps of pulling vacuum via the vacuum source, thereby evacuating air from within the impermeable membrane, and monitoring the flow meter to detect when a flow above a threshold flow is flowing through the flow meter. The method may also include the steps of locating a leak in the bladder, repairing the leak, and/or closing a valve of the flow meter such that no flow can enter the bladder via the vent when the flow above the threshold flow amount is detected through the flow meter.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

BRIEF DESCRIPTION OF THE DRAWING FIGURES

Embodiments of the present invention are described in detail below with reference to the attached drawing figures, wherein.

Figure 1:
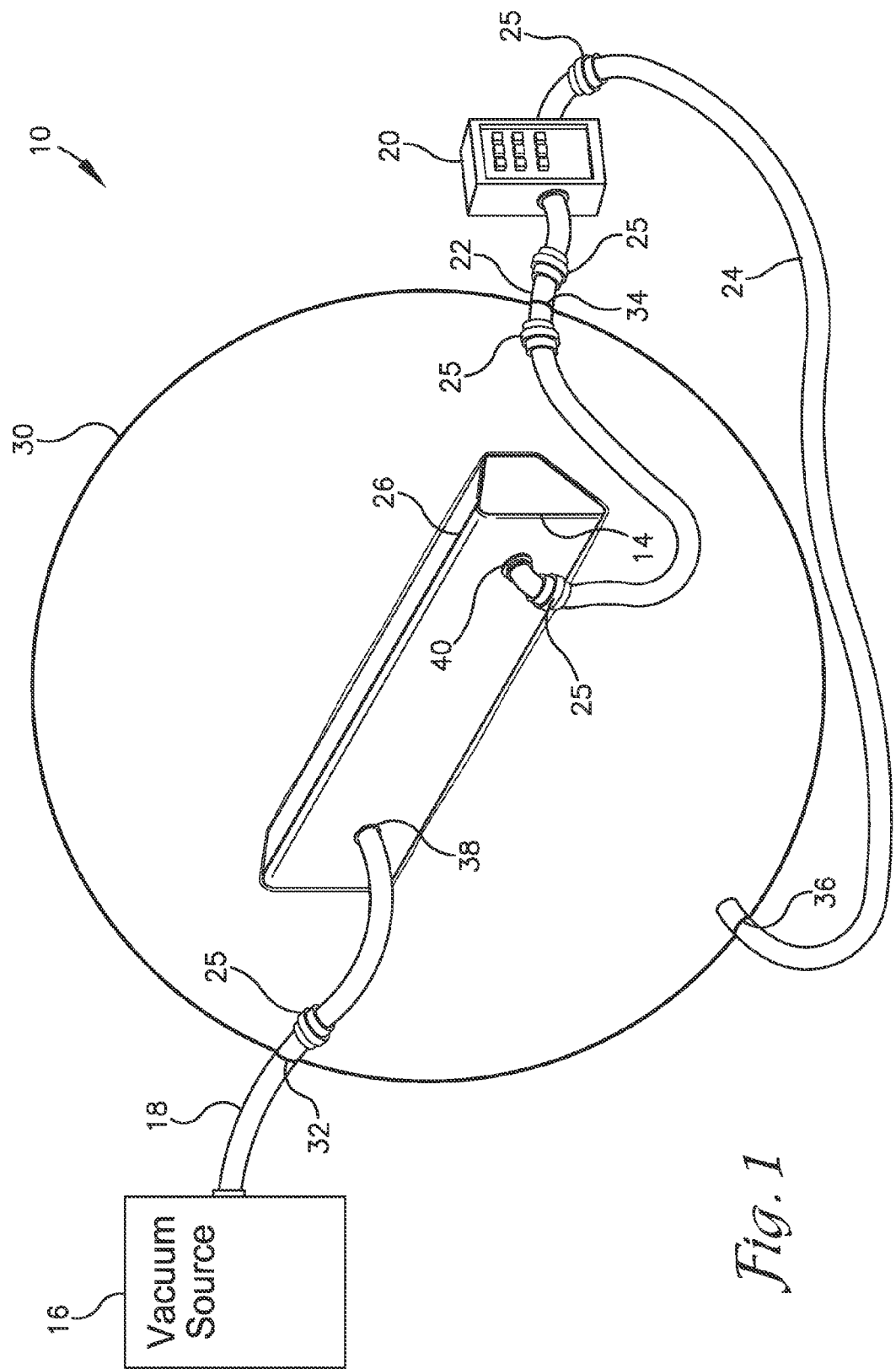
FIG. 1 is a schematic diagram of an autoclave health monitoring system constructed in accordance with an embodiment of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention is intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the present invention is defined only by claims presented in subsequent regular utility applications, along with the full scope of equivalents to which such claims are entitled.

In this description, references to "one embodiment," "an embodiment," or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, step, etc. described in one embodiment may also be included in other embodiments, but is not necessarily included. Thus, the present technology can include a variety of combinations and/or integrations of the embodiments described herein.

Figure 2:
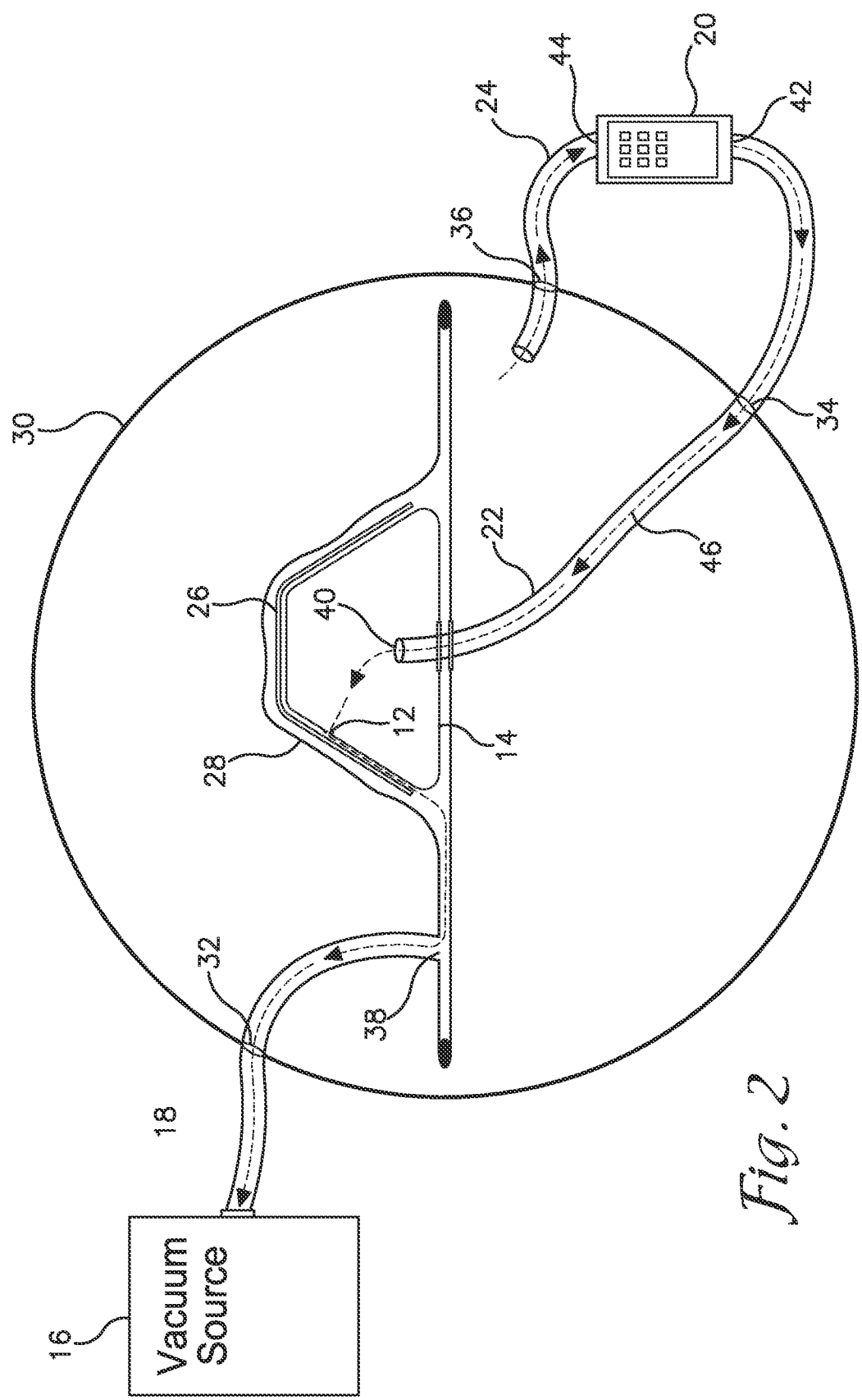
FIG. 2 is a schematic diagram of the autoclave health monitoring system of FIG. 1, further illustrating a cross-section of an impermeable membrane sealed around a composite material wrapped around a bladder being monitored by the autoclave health monitoring system.

An autoclave health monitoring system 10 constructed in accordance with embodiments of the invention is illustrated in FIGS. 1-4. The monitoring system 10 is configured to detect an air leak 12 in an inflatable bladder 14 used for forming a composite part via autoclave curing. The monitoring system 10 may comprise a vacuum source 16, vacuum tubing 18, a flow meter 20, bladder vent tubing 22, and flow meter tubing 24. The monitoring system 10 may also comprise one or more quick disconnect ports 25 for fluidly attaching various components of the monitoring system 10, as later described herein. As illustrated in FIGS. 1-2, the monitoring system 10 may operate in conjunction with the bladder 14, uncured composite material 26 applied to the bladder 14, a flexible, impermeable membrane 28 sealed around the composite material 26, and an autoclave 30 in which the composite material 26 is cured. In some embodiments of the invention, any oven suitable for curing the composite material 26 may be used in place of the autoclave 30 without departing from the scope of the invention.

Autoclave curing the composite part may include applying the uncured composite material 26 to the bladder 14 and sealing the impermeable membrane 28, such as a vacuum bag, around the composite material 26. During curing in the autoclave 30, vacuum may be applied such that the impermeable membrane 28 may compress against an outer surface of the uncured composite material 26 while the bladder 14, vented to autoclave atmosphere outward of the impermeable membrane 28, inflates and presses outward against an inner surface of the uncured composite material 26.

The autoclave 30 may comprise one or more walls forming a sealable chamber and may be configured to heat up to a desired cure temperature. The autoclave 30 may have a plurality of openings or air ports formed through one or more of the walls, such as a vacuum port 32 which the vacuum tubing 18 may attach to or extend through, a bladder vent tubing port 34 which the bladder vent tubing 22 may attach to or extend through, and a flow meter tubing port 36 which the flow meter tubing 24 may attach to or extend through. The impermeable membrane 28 may have a vacuum port 38, such as a quick disconnect port, formed therein and/or therethrough for attachment to the vacuum source 16 and/or the vacuum tubing 18 for evacuating air or atmosphere from between the impermeable membrane 28 and the bladder 14.

The bladder 14 may include one or more walls forming a hollow, flexible structure configured to inflate to a desired shape, size, and configuration for forming an inner surface of the composite part. The bladder 14 may comprise a vent 40, such as an opening or tube extending from one of the walls of the bladder 14 and outward of the impermeable membrane 28, so that atmosphere within the bladder 14 is exposed to atmosphere within the autoclave 30. In some embodiments of the invention, the vent 40 may include an aluminum vent-fitting and/or various stiffeners to keep the vent 40 fully opened. The vent 40 may also be configured with one of the quick disconnect ports 25 of the monitoring system 10 or some other means for ease of fluidly attaching the bladder vent tubing 22 to and disconnecting the bladder vent tubing 22 from the vent 40 of the bladder 14.

The vacuum source 16 may be any source or device configured to evacuate air or atmosphere from within the sealed impermeable membrane 28 and/or from the space sealed between the bladder 14 and the impermeable membrane 28 in which the composite material 26 resides. For example, the vacuum source 16 may create a vacuum level of 26 in. Hg. However, any amount of vacuum required for curing a particular composite material at a particular temperature may be applied by the vacuum source 16 without departing from the scope of the invention.

The vacuum tubing 18 may be one or more conduits, tubes, and/or pipes extending from the vacuum source 16 to the impermeable membrane's vacuum port 32. As noted above, pulling vacuum via the vacuum port 32 may collapse the impermeable membrane 28 against the composite material 26. Simultaneously, the bladder 14 may inflate so that the composite material 26 is compressed between the bladder 14 and the impermeable membrane 28. The vacuum tubing 18 may comprise one or more of the quick disconnect ports 25 for easily connecting or disconnecting different portions of the vacuum tubing 18, the vacuum source 16, and/or the vacuum port 32 of the impermeable membrane 28.

The flow meter 20, as illustrated in FIGS. 1-2, may be any sensor for detecting how much air or atmosphere is flowing from the vent 40 of the bladder 14. For example, the flow meter 20 may be a high temperature thermal flow meter to measure real-time flow rates of autoclave air passing into the bladder 14 through the bladder vent 40. As illustrated in FIG. 2, the flow meter 20 may comprise a first port 42 configured to be fluidly coupled with the bladder vent tubing 22 and a second port 44 configured to be fluidly coupled with the flow meter tubing 24. The flow meter 20 is configured to detect flow between the first port 42 and the second port 44. If any flow is detected by the flow meter 20, this generally indicates that air within the bladder 14 is being drawn by the vacuum source 16 into the space between the sealed impermeable membrane 28 and the bladder 14 through at least one leak 12 in the bladder 14. The flow meter 20 may be communicably coupled with various control and display components for sending and receiving information to and from a user or various data-gathering systems. For example, the flow meter 20 may be communicably coupled with a remote transmitter configured for sending and receiving signals to and from the flow meter 20.

In some embodiments of the invention, the flow meter 20 may further comprise a valve (not shown) configured to shut off air flow to the bladder 14, thereby collapsing the bladder 14. The valve of the flow meter 20 may be directly or remotely operated by an operator of the monitoring system 10. The valve may be located between the first and second ports 42,44 of the flow meter 20 or located at the first and/or second ports 42,44 of the flow meter 20. Collapsing the bladder 14 would result in a misshapen stringer or composite part, but would prevent global porosity throughout an integrated composite part having multiple sections being co-cured together, such as an integrated fuselage with a plurality of stringers, each being formed with a separate bladder, as later described herein.

The bladder vent tubing 22 may comprise one or more conduits, tubes, and/or pipes extending from the bladder vent 40 to the first port 42 of the flow meter 20. Specifically, the bladder vent tubing 22 may extend from the bladder vent 40, through the bladder vent tubing port 34 of the autoclave 30, and may allow air or atmosphere to pass from the flow meter 20 into the bladder 14, particularly if there is a leak in the bladder 14, such as the leak 12 illustrated in FIG. 2. For example, the vacuum source 16 may draw air from between the impermeable membrane 28 and the bladder 14 and additionally may draw air from the bladder 14 via the leak 12 (e.g., hole or tear in the bladder). The dash line labeled 46 in FIG. 2 illustrates the air flow through the leak 12 in one embodiment of the monitoring system 10. The bladder vent tubing 22 may further comprise one or more of the quick disconnect ports 25 for easily connecting or disconnecting different portions of the bladder vent tubing 22, the bladder 14, and/or the flow meter 20.

The flow meter tubing 24 may comprise one or more conduits, tubes, and/or pipes extending from the flow meter 20 to the autoclave 30. Specifically, the flow meter tubing 24 may extend through or attach to the flow meter tubing port 36 of the autoclave 30 and fluidly couple the second port 44 of the flow meter 20 with the atmosphere within the autoclave 30. In this configuration, if there is a leak in the bladder 14 during cure, air or atmosphere from within the autoclave 30, outward of the impermeable membrane 28, may flow through the flow meter tubing 24 to the flow meter 20 located outward of the autoclave 30, as illustrated in FIG. 2. Turning the valve of the flow meter 20 to a closed position may stop air from flowing through the flow meter tubing 24 to the flow meter 20. The flow meter tubing 24 may further comprise one or more of the quick disconnect ports 25 for easily connecting or disconnecting different portions of the flow meter tubing 24, the flow meter 20, and/or the flow meter tubing port 36 of the autoclave 30.

Figure 3:
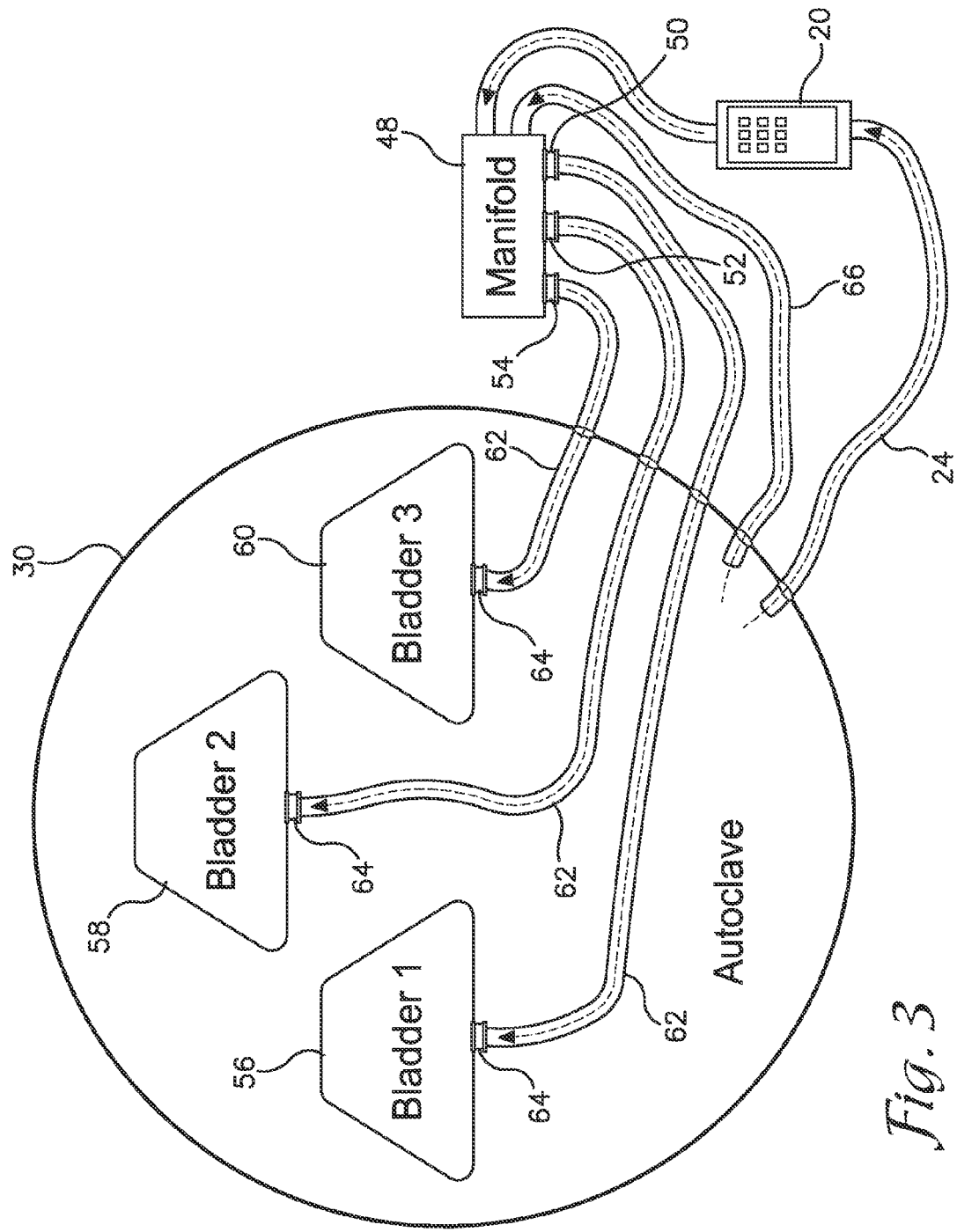
FIG. 3 is an alternative embodiment of the autoclave health monitoring system, illustrating a manifold fluidly coupling a flow meter with a plurality of bladders.

In an alternative embodiment of the invention, as illustrated in FIG. 3, the monitoring system 10 may comprise a manifold 48 with multiple manifold valves 50,52,54 fluidly coupled to a single flow meter (e.g., flow meter 20) or multiple flow meters (not shown) may each be individually connected with one of a plurality of bladders 56,58,60 being used to form different portions of a single integral composite part. The plurality of bladders 56-60 may each have the same characteristics as the bladder 14 described above. Furthermore, in this alternative embodiment of the invention, the monitoring system 10 may comprise a plurality of bladder vent tubes 62 each extending from vents 64 of each of the plurality of bladders 56-60 to one of the manifold valves 50-54 and/or one of the multiple flow meters. For example, as noted above, this alternative embodiment of the invention may be useful when forming an integrated composite part having multiple sections being co-cured together, such as an integrated fuselage with a plurality of stringers, each being formed with a separate bladder.

While separate flow meters could be used for each of the bladders 56-60 in the same manner as described above, the use of the manifold 48 may allow a single flow meter to be used, with the manifold 48 fluidly connecting each of the plurality of bladders 56-60 with the single flow meter 20. In this embodiment of the invention, the manifold 48 may automatically and/or manually be cycled through a sequence of opening and closing (or redirecting) the various manifold valves 50-54. If flow is detected, the operator may determine which of the bladders 56-60 has a leak based on which of the manifold valves 50-54 was open (or actuated to be directed through the flow meter 20) when the air flow was detected by the single flow meter 20. The manifold valves 50-54 may be solenoid valves or any valves known in the art for either opening and closing or redirecting flow therethrough.

Note that in some embodiments of the invention, rather than closing the valves 50-54 not currently opened or fluidly coupled with the flow meter 20, the valves 50-54 may be redirected to fluidly couple with a bypass tube 66 so that each of the vents 64 remain open to atmosphere within the autoclave 30, whether or not they are currently fluidly coupled with the flow meter 20. So instead of alternatingly opening and closing the valves 50-54, the sequence may alternatingly direct each of the valves 50-54 to either receive flow from the flow meter 20 and/or from the bypass tube 66, as illustrated in FIG. 3.

The manifold 48 may be manually operated by an operator or communicably coupled with a control system configured for commanding a sequence, timing, and operation of the manifold valves 50-54, For example, the control system may include a data acquisition unit, a network switch, a communication conversion module, and/or the remote transmitter configured to communicate with each other, the flow meter, and/or the manifold valves 50-54. However, any control system for actuating the manifold valves 50-54 and/or the flow meter 20 as described herein may be used without departing from the scope of the invention.

In use, the monitoring system 10 is configured to identify leaks 12 in bladders 14 prior to a critical stage of an autoclave cure cycle. This stage occurs when the composite material 26 reaches a pre-determined temperature, such as a temperature at or greater than a temperature threshold at or between 180° and 200° F. This may be determined using any thermometer or temperature sensor known in the art. Note that there should be little to no flow through the flow meter 20 unless there is a bladder leak. However, if the flow meter 20 detects flow above an acceptable threshold of flow, the operator may be notified via an automated audio or visual alarm communicably coupled with the flow meter 20 or may simply view on a visual flow indicator of the flow meter 20 that the amount of flow is greater than the acceptable threshold of flow. If the temperature is not yet at the critical stage when the flow meter 20 detects a bladder leak, the operator may stop the cure process, repair the bladder 14, and then reconnect and insert all of the necessary parts to continue the cure cycle. If the temperature is at or above the critical stage, the operator may simply decide to turn the valve of the flow meter 20 off, thereby allowing the bladder 14 to collapse.

Figure 4:
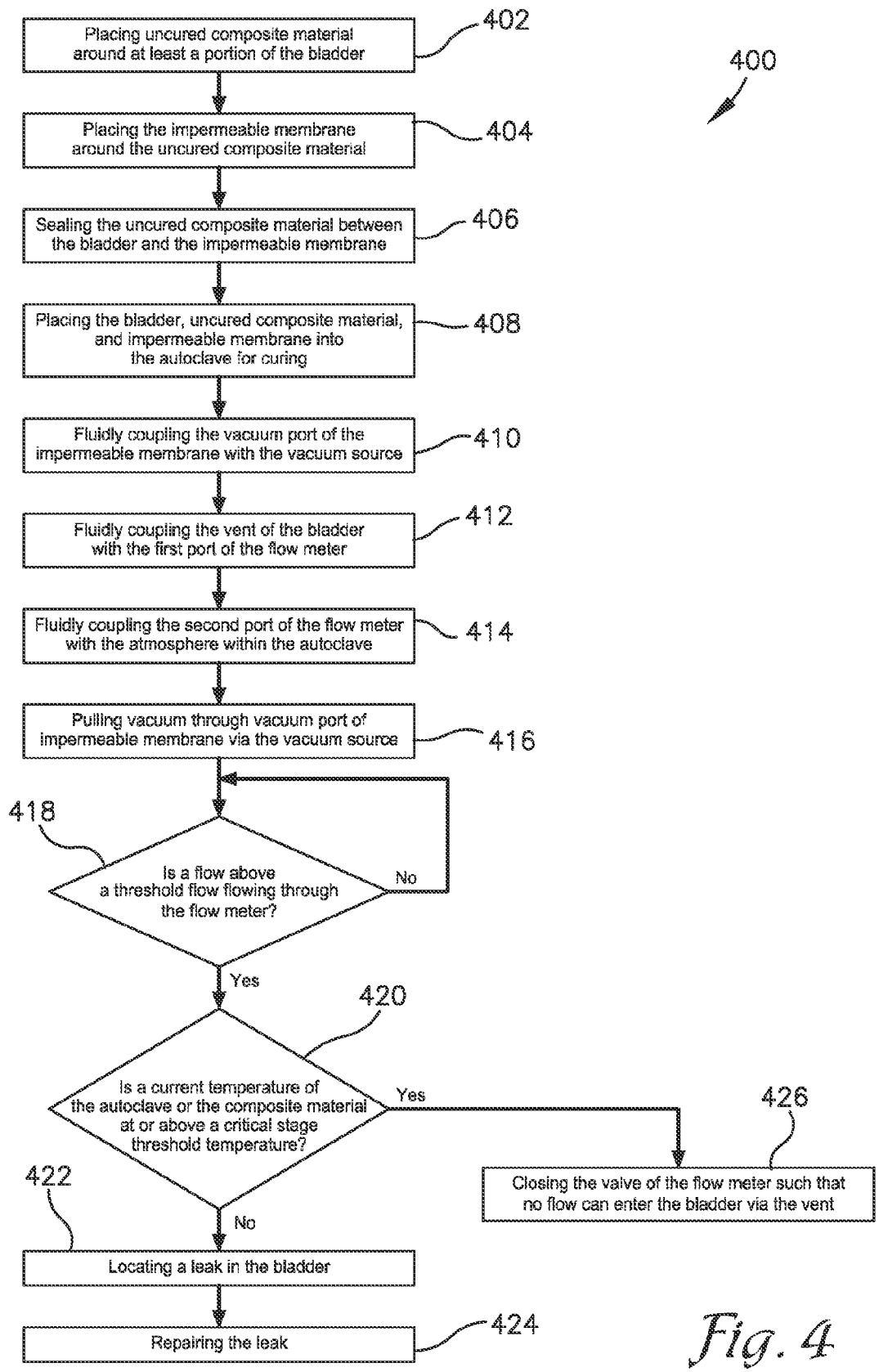
FIG. 4 is a flow chart illustrating a method of detecting leaks in a bladder in accordance with an embodiment of the present invention.

The flow chart of FIG. 4 depicts the steps of an exemplary method 400 for detecting leaks in the bladder 14. In some alternative implementations, the functions noted in the various blocks may occur out of the order depicted in FIG. 4. For example, two blocks shown in succession in FIG. 4 may in fact be executed substantially concurrently, or the blocks may sometimes be executed in the reverse order depending upon the functionality involved.

The method 400, illustrated in FIG. 4, may first include the steps of placing the uncured composite material 26 around at least a portion of the bladder 14, as depicted in block 402, placing the impermeable membrane 28 around the uncured composite material 26, as depicted in block 404, sealing the uncured composite material 26 between the bladder 14 and the impermeable membrane 28, as depicted in block 406, and placing the bladder 14, uncured composite material 26, and impermeable membrane 28 into the autoclave 30 for curing, as depicted in block 408. Note that the vent 40 or an opening at an end of the vent 40 may extend outward of the impermeable membrane 28. For example, the impermeable membrane 28 may be sealed to the bladder 14 and/or the vent 40 in such a manner as to not cover an opening of the vent 40. The uncured composite material 26 may be completely sealed between the bladder 14 and the impermeable membrane 28. Note that any of steps 402 through 408 may be omitted or performed by another entity or individual prior to the remaining steps without departing from the scope of the invention.

The method 400 may also include the steps of fluidly coupling the vacuum port 38 of the impermeable membrane 28 with the vacuum source 16, as in block 410, and fluidly coupling the vent 40 of the bladder 14 with the first port 42 of the flow meter 20, as depicted in block 412. Specifically, vacuum tubing 18 may extend through the vacuum tubing port 32 of the autoclave 30 to fluidly couple the vacuum source 16 with the atmosphere within the impermeable membrane 28. Furthermore, the bladder vent tubing 22 may extend through the bladder vent tubing port 34 of the autoclave 30 and fluidly couple the bladder 14 with the flow meter 20. Note that the second port 44 of the flow meter 20 may already be fluidly coupled with atmosphere within the autoclave 30, via the flow meter tubing port 36. However, in some embodiments of the invention, the method 400 may further include a step of fluidly coupling the second pod 44 of the flow meter 20 with the atmosphere within the autoclave 30, as depicted in block 414.

The method 400 may also include the steps of pulling vacuum via the vacuum source 16, as depicted in block 416, thereby evacuating air from within the impermeable membrane 28, and monitoring the flow meter 20 to detect when a flow above a threshold flow is flowing through the flow meter 20, as depicted in block 418. In some embodiments of the invention, the step 418 of monitoring the flow meter 20 may include monitoring multiple flow meters each fluidly coupled with a different one of the plurality of bladders 56-60 in the autoclave 30. Alternatively, the step 418 of monitoring the flow meter 20 may include alternatingly opening or redirecting each of the manifold valves 50-54 to be fluidly coupled with the flow meter 20 and then determining which of the plurality of bladders 56-60 has a leak therein based on which of the manifold valves 50-54 is in an open position or otherwise directed to receive air from the flow meter 20 when the flow meter 20 detects flow above the threshold flow.

If the flow meter 20 detects that the flow is above the threshold flow amount, the method 400 may include determining if a current temperature of the autoclave 30 or the composite material 26 is above, at, or below a critical stage threshold temperature, as depicted in block 420. If the autoclave 30 or composite material 26 has a temperature below the critical stage threshold temperature when the leak 12 is detected, the method 400 may proceed through the steps of locating the leak 12 in the bladder 14, as depicted in block 422 and repairing the leak 12, as depicted in block 424. However, if the autoclave 30 or composite material 26 has a temperature at or greater than the critical-stage threshold temperature when the leak 12 is detected in the bladder 14, the method 400 may proceed through a step of closing the valve of the flow meter 20 such that no flow can enter the bladder 14 via the vent 40, as depicted in block 426.

For example, in the event of a bladder leak being identified prior to the critical-stage temperature, such as 190 F or any pre-determined critical stage temperature threshold, the operator may abort the cure cycle and open a door of the autoclave 30. In the embodiment of the invention illustrated in FIG. 3, the operator can determine which one of the bladders 56-60 is leaking based on which one of the flow meters experienced flow and/or which of the manifold valves 50-54 was opened when a threshold amount of flow was detected by the flow meter 20. The operator can therefore investigate that particular bladder to ensure that the bondline between that one of the bladders 56,58,60 and its corresponding vent 64 (e.g., an aluminum vent-fitting) and/or between the vent 64 and the corresponding one of the bladder vent tubes 62 is intact and not leaking. For example, the operator may use soapy water and positive pressure internal to the bladder as an indicator of a leak at that location. The operator may insert a tool or bag or may use any repair techniques to fluidly repair the leaky bladder. Then the operator may reconnect the vacuum tubing 18 to a new impermeable membrane 28 (e.g., via a quick-disconnect fitting), close the door of the autoclave 30, and restart the cure. If flow is noticed once again, the valve of the flow meter 20 can be shut and the bladder can be collapsed in order to preserve the integrity of the surrounding composite part.

Advantageously, the monitoring system 10 of the present invention recycles the autoclave air through the walls of the autoclave 30 and the flow meter 20 is capable of withstanding 350° F. to monitor vacuum levels internal to the autoclave 30.

Although the invention has been described with reference to the preferred embodiment illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method for monitoring an inflatable bladder during curing of a composite part, wherein an uncured composite material is positioned outward of the bladder and inward of an impermeable membrane:
   placing the bladder, uncured composite material, and impermeable membrane into an autoclave for curing the composite part;
   fluidly coupling a vacuum port of the impermeable membrane with a vacuum source;
   fluidly coupling a vent of the bladder with a first port of a flow meter, wherein a second port of the flow meter is fluidly coupled with atmosphere within the autoclave, wherein the flow meter is located outward of the bladder and outward of the autoclave;
   pulling vacuum via the vacuum source, thereby evacuating air from within the impermeable membrane;
   monitoring the flow meter to detect when a flow above a threshold flow is flowing through the flow meter;
   performing one of the following steps when the flow above the threshold flow amount is detected through the flow meter:
      locating a leak in the bladder and repairing the leak, and
      closing a valve of the flow meter such that no flow can enter the bladder via the vent.

2. The method of claim 1, wherein the flow meter is fluidly coupled with the vent and the atmosphere within the autoclave by conduits extending from the first and second ports through openings in walls of the autoclave.

3. The method of claim 1, wherein the impermeable membrane is a sealed vacuum bag for curing composite material.

4. The method of claim 1, wherein the impermeable membrane is at least one of sealed to and sealed around the bladder, with the uncured composite material located between the impermeable membrane and the bladder.

5. The method of claim 1, wherein the first port of the flow meter is fluidly coupled with a plurality of bladders within the autoclave via a manifold having at least two manifold valves each fluidly coupled with one of the plurality of bladders.

6. The method of claim 5, further comprising alternatingly opening or redirecting the at least two manifold valves to fluidly couple with the flow meter and determining which of the plurality of bladders has a leak therein based on which of the manifold valves is in an open position or is redirected to receive flow from the flow meter when flow above the threshold flow is detected by the flow meter.

7. The method of claim 1, further comprising heating the autoclave to a cure temperature.

8. The method of claim 1, further comprising monitoring a temperature within the autoclave and closing the valve of the flow meter when the flow above the threshold flow amount is detected through the flow meter if the temperature within the autoclave is above a critical stage threshold temperature.

9. A method for monitoring an inflatable bladder during curing of a composite part:
   placing uncured composite material around at least a portion of the bladder;
   placing an impermeable membrane around the uncured composite material, sealing the uncured composite material between the bladder and the impermeable membrane;
   placing the bladder, uncured composite material, and impermeable membrane into an autoclave for curing the composite part;
   fluidly coupling a vacuum port of the impermeable membrane with a vacuum source;
   fluidly coupling a vent of the bladder with a first port of a flow meter located outward of the autoclave and outward of the bladder, wherein a second port of the flow meter is fluidly coupled with atmosphere within the autoclave;
   pulling vacuum via the vacuum source, thereby evacuating air from within the impermeable membrane;
   monitoring the flow meter to detect when a flow above a threshold flow is flowing through the flow meter;
   performing one of the following steps when the flow above the threshold flow amount is detected through the flow meter:
      locating a leak in the bladder and repairing the leak, and
      closing a valve of the flow meter such that no flow can enter the bladder via the vent.

10. The method of claim 9, wherein the flow meter is fluidly coupled with the vent and the atmosphere within the autoclave by conduits extending from the first and second ports through openings in walls of the autoclave.

11. The method of claim 9, wherein the impermeable membrane is a sealed vacuum bag for curing composite material.

12. The method of claim 9, wherein the impermeable membrane is at least one of sealed to and sealed around the bladder, with the uncured composite material located between the impermeable membrane and the bladder.

13. The method of claim 9, wherein the first port of the flow meter is fluidly coupled with a plurality of bladders within the autoclave via a manifold having at least two manifold valves each fluidly coupled with at least one of a plurality of vents of the plurality of bladders.

14. The method of claim 13, further comprising alternatingly opening or redirecting the at least two manifold valves to fluidly couple with the flow meter and determining which of the plurality of bladders has a leak therein based on which of the manifold valves is in an open position or is redirected to receive flow from the flow meter when flow above the threshold flow is detected by the flow meter.

15. The method of claim 9, further comprising monitoring a temperature within the autoclave and closing the valve of the flow meter when the flow above the threshold flow amount is detected through the flow meter if the temperature within the autoclave is above a critical stage threshold temperature.

16. The method of claim 7, further comprising a user turning the valve of the flow meter to a closed position while the autoclave is being heated when an audible or visual alarm indicates that the flow above the threshold flow amount is detected.

* * * * *